United States Patent [19]

Poloso et al.

[11] 4,028,485

[45] June 7, 1977

[54] NON-AQUEOUS REMOVAL OF SOLUBLE HYDROGENATION CATALYST

[75] Inventors: Anthony Poloso, Ridgefield; James Gordon Murray, East Brunswick, both of N.J.

[73] Assignee: Mobil Oil Corporation, New York, N.Y.

[22] Filed: Jan. 29, 1976

[21] Appl. No.: 653,413

[52] U.S. Cl. .................. 528/486; 260/96 HY; 260/676 R; 526/25; 526/20
[51] Int. Cl.$^2$ .................. C08F 6/08; C08F 8/04
[58] Field of Search .................. 528/486; 526/25; 260/96 HY

[56] References Cited

UNITED STATES PATENTS

| 2,137,627 | 11/1938 | Reed | 260/2 |
| 2,893,982 | 7/1959 | Campbell | 260/85.1 |
| 3,023,201 | 2/1962 | Moberly et al. | 260/94.7 |

Primary Examiner—Stanford M. Levin
Attorney, Agent, or Firm—Charles A. Huggett; Ronald J. Cier

[57] ABSTRACT

A process for readily removing hydrogenation catalyst residue from solutions of hydrogenated olefins or olefinic polymers containing same comprising treating such solutions with non-aqueous acid followed by neutralization with anhydrous base and filtration.

10 Claims, No Drawings

NON-AQUEOUS REMOVAL OF SOLUBLE HYDROGENATION CATALYST

BACKGROUND OF THE INVENTION

1. Field of the Invention

This invention relates to a non-aqueous process for the removal of metallic residue, e.g., of a soluble organonickel hydrogenation catalyst such as mixtures of organonickel and alkylaluminum or alkyllithium, from solutions of hydrogenated material such as hydrogenated polymers, e.g., styrene-butadiene, by treating such solutions with non-aqueous acid, for example, glacial acetic acid followed by neutralization with anhydrous base, e.g., anhydrous ammonia, and filtration.

2. Description of the Prior Art

Removal of soluble hydrogenation catalyst residue from hydrogenation solutions has generally comprised treatment with an aqueous solution containing an agent to facilitate removal of said residue. Thus U.S. Pat. No. 3,634,549 describes the removal of hydrogenation catalyst (e.g., nickel octoate/triethylaluminum) residue by treating a solution containing a hydrogenated polymer with dilute hydrochloric acid and water; and U.S. Pat. No. 3,531,448 describes the precipitation of metallic catalyst residue by treatment with aqueous ammonium phosphate followed by filtration. This is disadvantageous if further reactions on the product are to be conducted in an anhydrous solution and/or it is desirable prior to further reaction to remove the catalyst without isolating the hydrogenated material or treating it with aqueous reagents to remove the catalyst.

SUMMARY OF THE INVENTION

The present invention provides a process for the removal of metallic, i.e., hydrogenation catalyst residue from a solution or composition containing hydrogenated material, e.g., olefins and/or olefinic polymers.

In an embodiment according to this invention, a process is provided for removing the residue of an organonickel hydrogenation catalyst formed by (1) mixing organonickel (e.g., nickel octoate) and alkylaluminum (e.g., triethylaluminum) or (2) by mixing organonickel and alkyllithium (e.g., butyllithium) from a hydrogenation solution containing said catalyst and a hydrogenated polymer (e.g., styrene-butadiene) in a hydrocarbon solvent (e.g., cyclohexane) comprising contacting said hydrogenation solution with non-aqueous organic acid (e.g., glacial acetic acid) followed by neutralization with anhydrous base (e.g., anhydrous ammonia) and filtration.

Accordingly, this invention more particularly provides a process for the removal of hydrogenation catalyst residue, wherein said hydrogenation catalyst was formed by mixing (a) a $C_1$–$C_8$ alkylaluminum or a $C_1$–$C_8$ alkyllithium compound and (b) an organonickel compound of the following formula:

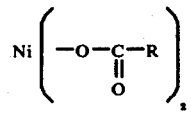

where R is hydrogen or $C_1$–$C_{12}$ alkyl or cycloalkyl, from a solution containing said hydrogenation catalyst and from about 1 to 50 wt. % of a hydrogenated olefin or olefinic polymer in a hydrocarbon solvent comprising contacting said solution with non-aqueous solution of an acid, followed by neutralization with anhydrous base and filtration of said solution thereby removing said hydrogenation catalyst residue.

DESCRIPTION OF SPECIFIC EMBODIMENTS

In accordance with this invention treatment of a hydrogenation solution containing a hydrogenated olefin or olefinic polymer and an organonickel hydrogenation catalyst with a substantially non-aqueous organic acid, e.g., alkanoic acid such as acetic or formic acids followed by neutralization with anhydrous base and filtration readily removes metallic impurities, i.e., catalyst residues from the solution.

Organonickel hydrogenation catalyst particularly well suited to the present invention are the reaction products or mixtures of organonickel and alkylaluminum or alkyllithium compounds. Typical nickel compounds include nickel stearate, nickel acetate, nickel propionate, nickel formate, nickel octoate and the like; nickel octoate is preferred. The aluminum compounds are preferably trialkylaluminum wherein the alkyl radical has from 1 to 8 carbon atoms. Typical of such aluminum compounds are trimethylaluminum, triethylaluminum, triisobutylaluminum, tripentylaluminum, trioctylaluminum and the like; preferred is triethylaluminum. The lithium compounds are preferably $C_1$–$C_8$ alkyllithium; typical of the lithium compounds are ethyllithium, isopropyllithium, butyllithium and the like. Preferred is butyllithium. The mixture of organonickel and alkylaluminum or alkyllithium usually has a molar ratio of nickel to aluminum or lithium between about 1 to 2.5–5; a 1 to 3 or 1 to 4 molar ratio is preferred.

The hydrogenated materials or rather materials to be hydrogenated include olefinic compounds having 2 to 12 carbon atoms and polymers having olefinic or both olefinic and aromatic unsaturation, such as 2 to 8 carbon olefin homopolymers and copolymers, polymers of dienes such as butadiene polymers, copolymers of conjugated dienes and aromatic compounds such as styrene-butadiene copolymers and the like.

The hydrogenated material is generally treated while dissolved in solution, preferably a hydrocarbon solvent such as n-pentane, n-octane, cyclohexane, benzene, toluene and the like or mixtures of these. Preferred are cyclohexane and benzene. The content of hydrogenated material in the solution can vary from 1 to about 50 weight percent or more; concentrations of about 5 to 25 weight percent are preferred.

Mixtures of nickel octoate with either butyllithium or triethylaluminum are highly useful for the preferred embodiment of this invention, that is hydrogenating polymer solutions, particularly styrene-butadiene solutions. Accordingly, a highly preferred use of the process of this invention is treatment of hydrogenated styrene-butadiene compositions for the removal of nickel octoate/lithium or nickel octoate/aluminum catalyst residue from hydrogenated styrene-butadiene polymer compositions. Such copolymer compositions can be prepared by any conventional technique known in the art. Likewise the hydrogenation can be carried out in any manner known to the art. The styrene-butadiene copolymers usually have a molecular weight ranging from about 25,000 to about 150,000 with about 5–60% styrene units, and preferably 10–55% styrene units, based on the total number of styrene and butadiene units. The hydrogenation material, e.g., styrene-butadiene copolymer, is sufficiently hydrogenated to remove substantially all of the olefinic unsaturation.

In accordance with the process of this invention, a polymeric composition such as styrene-butadiene copolymer as above described is contacted in solution with a hydrogenation catalyst under hydrogenation conditions of temperature and pressure which include temperatures from about 50°–200° C and pressures from about 1–600 psi. Preferred conditions are temperatures from 50°–75° C and pressures from 300–500 psi. The pressure is normally maintained at that level sufficient to keep the reaction mixture substantially in liquid phase.

In treating the hydrogenated material, any nonaqueous acid, which is soluble in organic solvents, such as for example formic, acetic, chloroacetic, fluoroacetic, and methane sulfonic acids may be used. Glacial acetic acid is preferred. The amount of acid used will depend interalia upon the amount of hydrogenated material. Suitable is an acid level of from about 0.25–5% based on the amount of hydrogenated material, e.g., polymer present in the solution. Preferred acid level is >0.25, e.g., from 1–2%.

Numerous anhydrous basic materials may be used to neutralize excess acid. These include anhydrous NaOH, $NH_3$, CaO, BaO, $K_2CO_3$, $Na_2CO_3$ and mixtures of NaOH and CaO as well as the alkali and alkaline earth metals and hydrides. Usually the anhydrous base is selected from the former group, that is NaOH, KOH, $NH_3$, etc.

Any suitable filtration material or means may be used in this invention. Preferred is filtration through diatomaceous earth or silica having a particle size of from about 1.5 microns to about 15 microns.

The following examples are merely representative of the process described herein and are not intended to limit in any manner the scope of this invention.

EXAMPLE I

Samples of styrene-butadiene polymer were prepared using a butyllithium initiator and then hydrogenated using a nickel octoate-triethylaluminum catalyst. The catalyst was prepared by prereacting triethylaluminum with nickel octoate in a three to one mole ratio in a benzene solution. This catalyst solution was then added to an autoclave containing a 15% solution (1400 grams) of styrene-butadiene polymer (MW 85,000) in cyclohexane after purging well with nitrogen. Hydrogen was pressured into the autoclave and the hydrogenation carried out at 300–500 psi until the olefinic unsaturation in the polymer had been reduced to a level of >5% of the original value.

The metal salts, i.e., metallic residue from the hydrogenation catalyst were removed from the hydrogenation solution in the following manner. A sample of polymer which by analysis contained 310 ppm Ni, 740 ppm of aluminum and 180 ppm lithium (relative to the amount of polymer in the sample) was refluxed with 4% glacial acetic acid (relative to the polymer) for four hours. The batch was divided into two equal portions and one half (part A) of the batch was stirred with 5% (relative to the polymer) of powdered calcium oxide by stirring at reflux for an hour and the other half (part B) was treated with 1.4% of anhydrous ammonia. These solutions were then filtered through diatomaceous earth, the solvent evaporated and the isolated polymer analyzed for metals with the results given in Table I.

TABLE I

| Sample | Initial Metals Content (ppm) | | | Final Metals Content (ppm) | | |
|---|---|---|---|---|---|---|
| | Ni | Al | Li | Ni | Al | Li |
| A | 310 | 740 | 180 | 5.8 | 39 | 1.1 |
| B | 310 | 740 | 180 | 5.6 | 38 | 0.7 |

EXAMPLE II

A styrene-butadiene polymer as in Example I was hydrogenated with a 4:1 mole ratio of butyllithium and nickel octoate until the unsaturation level had been reduced to <5% of the original value. The product was refluxed for 2 hours with 2% (based on the polymer) of glacial acetic acid and filtered through diatomaceous earth. The filtrate was stirred at reflux for 2 hours with 10% (based on the polymer) of NaOH pellets and the product again filtered. Before treatment, analysis of the polymer showed 420 ppm nickel and 530 ppm lithium. After treatment, these values had been reduced to 87 ppm nickel and 45 ppm lithium.

EXAMPLE III

To determine the effect or efficiency of the process embodied herein, when carried out under varying conditions, e.g., varying amounts of glacial acetic acid, and various combinations of neutralization agents and neutralization treatment time were used.

A series of four catalyst removal treatments was thus carried out on 15% solutions of styrene-butadiene polymer which had been hydrogenated in accordance with Example I with triethylaluminum nickel octoate in a 4:1 mole ratio (about 200 ppm of nickel based on polymer). These solutions were treated with acetic acid, neutralized and filtered through diatomaceous earth with the results given in Table II.

TABLE II

| Sample | Acetic % | Temp ° C | Time hrs | Neutralization | | | | Analysis (ppm) | | |
|---|---|---|---|---|---|---|---|---|---|---|
| | | | | Type | Wt% | Temp ° C | Time (hrs) | Ni | Al | Li |
| A | 2.0 | 100 | <0.5 | NaOH | 10 | 100 | 1.0 | <2 | 48 | <2 |
| B | 1.0 | 100 | 0.5 | CaO | 2.5 | 100 | 1.0 | 51 | 110 | 30 |
| C | 0.5 | 100 | 0.75 | CaO | 1.25 | 100 | 2.0 | 120 | 250 | 81 |
| D | 0.25 | 100 | 1.0 | $NH_3$ | 0.16 | 100 | 2.0 | 190 | 350 | 131 |

The above data clearly demonstrate the improved method of removing catalyst residue from hydrogenation solutions achieved by means of the process disclosed herein.

Although this invention has been described with preferred embodiments, it is to be understood that modifications and variations may be resorted to without departing from the spirit and scope of this invention, as one of ordinary skill in the art will readily understand.

What is claimed is:

1. A process for the removal of hydrogenation catalyst residue, wherein said hydrogenation catalyst was formed by mixing (a) a $C_1$–$C_8$ alkylaluminum or a $C_1$–$C_8$ alkyllithium compound and (b) an organonickel compound of the following formula:

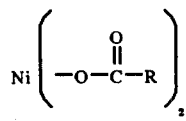

where R is hydrogen or $C_1$–$C_{12}$ alkyl or cycloalkyl, from a solution containing said hydrogenation catalyst and from about 1 to 50 wt. % of a hydrogenated olefinic polymer in a hydrocarbon solvent, said process comprising contacting said solution with a non-aqueous organic acid followed by neutralization with anhydrous base and filtration of said solution, thereby removing said hydrogenation catalyst residue.

2. A process in accordance with claim 1 wherein said olefinic polymer is a styrene-butadiene copolymer.

3. A process in accordance with claim 1 wherein said styrene-butadiene copolymer contains from about 5–60% styrene units based on the total number of units of styrene and butadiene.

4. A process in accordance with claim 1 wherein the hydrocarbon solvent is selected from benzene and cyclohexane.

5. A process in accordance with claim 1 wherein the anhydrous base is selected from anhydrous NaOH, KOH, $NH_3$, CaO, BaO, $K_2CO_3$, $Na_2CO_3$ and mixtures of NaOH and CaO.

6. A process in accordance with claim 5 wherein said anhydrous base is anhydrous $NH_3$.

7. A process in accordance with claim 1 wherein said acid is glacial acetic acid.

8. A process in accordance with claim 7 wherein said hydrogenation solution contains from about 0.25–5.0% of said acetic acid based on the total amount of hydrogenated material in said hydrogenation solution.

9. A process in accordance with claim 8 wherein said solution contains from about 1.0–2.0% acetic acid.

10. A process in accordance with claim 1 wherein said catalyst is formed by mixing (a) triethylaluminum or butyllithium and (b) nickel octoate.

* * * * *

UNITED STATES PATENT AND TRADEMARK OFFICE
CERTIFICATE OF CORRECTION

PATENT NO. : 4,028,485
DATED : June 7, 1977
INVENTOR(S) : ANTHONY POLOSO and JAMES GORDON MURRAY It is certified that error appears in the above–identified patent and that said Letters Patent are hereby corrected as shown below:

Col. 3, line 60 " $>5\%$ " should be -- $<5\%$ --

Signed and Sealed this

Fifteenth Day of November 1977

[SEAL]

Attest:

RUTH C. MASON
Attesting Officer

LUTRELLE F. PARKER
Acting Commissioner of Patents and Trademarks